United States Patent
Bluestone et al.

(10) Patent No.: US 12,196,305 B2
(45) Date of Patent: Jan. 14, 2025

(54) MINIMUM GRIP SPROCKET DRIVE SYSTEM

(71) Applicants: Ronald Bluestone, Lake Havasu City, AZ (US); Ryan Bluestone, Lake Havasu City, AZ (US)

(72) Inventors: Ronald Bluestone, Lake Havasu City, AZ (US); Ryan Bluestone, Lake Havasu City, AZ (US)

( * ) Notice: Subject to any disclaimer, the term of this patent is extended or adjusted under 35 U.S.C. 154(b) by 0 days.

(21) Appl. No.: 18/408,576

(22) Filed: Jan. 10, 2024

(65) Prior Publication Data

US 2024/0360896 A1    Oct. 31, 2024

Related U.S. Application Data

(60) Provisional application No. 63/438,224, filed on Jan. 10, 2023.

(51) Int. Cl.
F16H 55/30      (2006.01)
F16H 7/06       (2006.01)

(52) U.S. Cl.
CPC ............. *F16H 55/30* (2013.01); *F16H 7/06* (2013.01)

(58) Field of Classification Search
CPC ............. F16H 55/30; F16H 55/32; F16H 7/06
USPC .......................................................... 474/156
See application file for complete search history.

(56) References Cited

U.S. PATENT DOCUMENTS

| | | | |
|---|---|---|---|
| 1,222,625 A * | 4/1917 | Hay | F16H 55/30 |
| | | | 29/893.2 |
| 3,487,706 A * | 1/1970 | Resener | F16H 55/30 |
| | | | 474/902 |
| 6,267,249 B1 * | 7/2001 | Carpenter | B65G 47/967 |
| | | | 209/912 |
| 9,933,040 B2 * | 4/2018 | Junker | F16G 13/00 |
| 10,295,027 B2 * | 5/2019 | Izutsu | F02B 67/04 |
| 10,557,385 B2 * | 2/2020 | Pritchard | F01L 1/348 |
| 11,867,274 B2 * | 1/2024 | Hobbs | F16H 55/10 |
| 2017/0167570 A1 * | 6/2017 | Junker | F16H 9/24 |
| 2017/0314653 A1 * | 11/2017 | Izutsu | F16H 55/32 |
| 2019/0010837 A1 * | 1/2019 | Pritchard | F01L 1/047 |
| 2020/0040979 A1 * | 2/2020 | Akanishi | B62M 9/00 |
| 2021/0277986 A1 * | 9/2021 | Hobbs | F16H 55/30 |

* cited by examiner

*Primary Examiner* — Henry Y Liu
(74) *Attorney, Agent, or Firm* — Paul B. Heynssens; ATTORNEY AT LAW PLC

(57) ABSTRACT

A minimum grip drive sprocket. A sprocket having a knurled chain engagement surface rotably engages a drive chain typically in an environment exposed to a slick or lubricating medium allowing an acceptable degree of drive chain slip while maintaining rotation of the minimum grip drive socket.

6 Claims, 9 Drawing Sheets

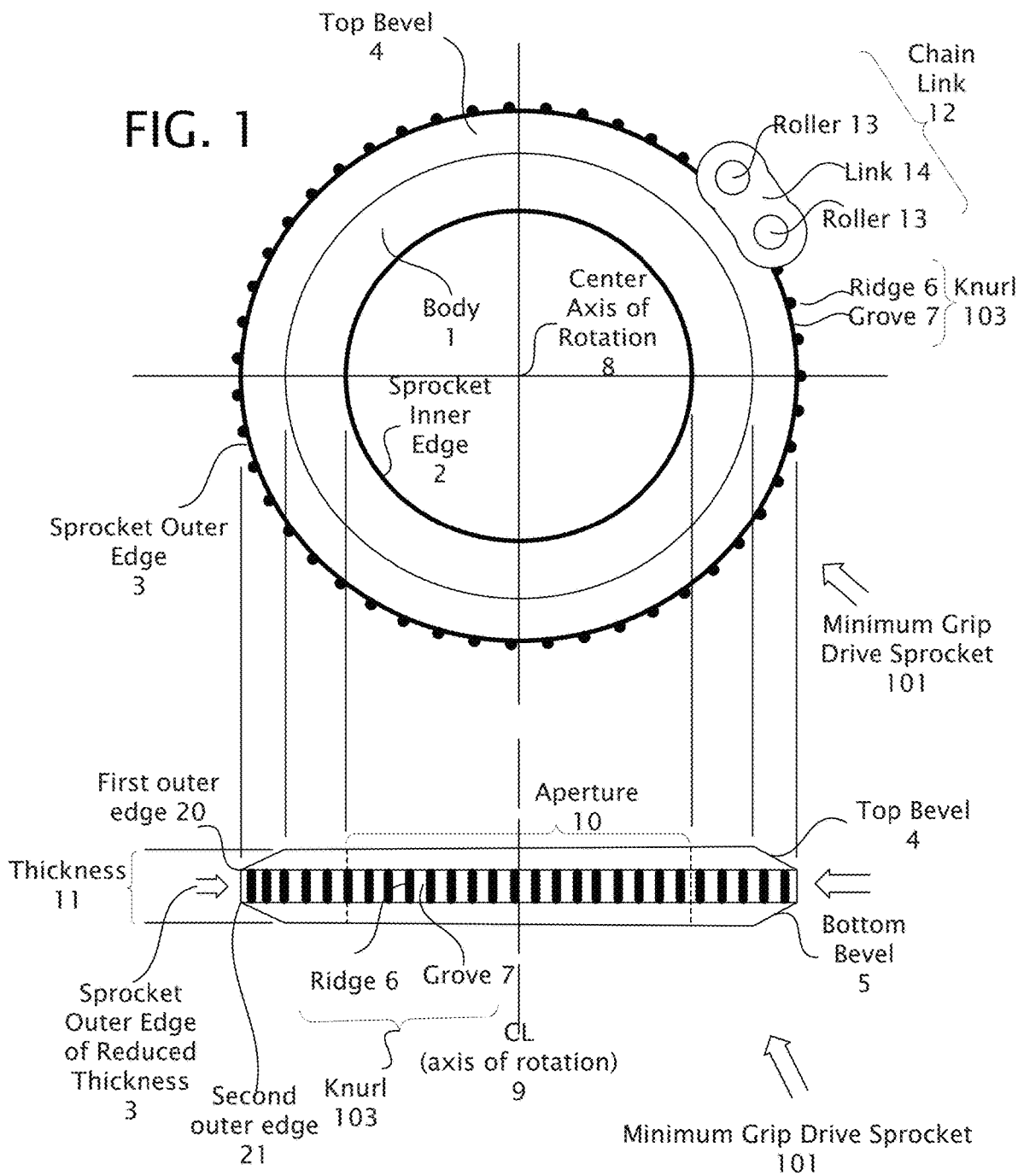

Dimpled Pattern 1002

Alternate Minimum Grip Drive Sprocket 1001

MINIMUM GRIP SPROCKET DRIVE SYSTEM

TECHNICAL FIELD

This description relates generally to drive mechanisms and more specifically to drive mechanisms used in slippery environments.

BACKGROUND

Exemplary, parts washers are often used in machine shops, manufacturing, automotive transmission, and engine repair shops. Also used in cleaning are soak tanks. Soak tanks are vessels containing a solvent, such as a mixture of water and detergent, which may take hours to "soften" the built-up road grime, fluids, tars, and oils enough to be manually rinsed off prior to disassembly and repair. Heating the solution and brushing can aid in loosening dirt and grime.

Gasoline, diesel fuel, and kerosene were commonly used to clean and degrease parts. Later, chlorinated solvents used in vapor degreasers were common. Environmental concerns led to the banning of chlorinated solvents for parts cleaning, which lead back to aqueous-based cleaning systems, but with improvements. Hydraulic sprays may be used to improve the cleaning of parts by directing a pressurized solvent stream at a part from nozzles typically placed in fixed locations, as is the case in manufacturing, so that spray may be applied where needed to effectuate cleaning. Typically a parts washer may require a drive system to move various mechanical components like conveyors, pumps and the like.

Typically, such machinery through the use of such solvents, greases and oils on parts being cleansed tends to broadcast, spray, or deposit slippery substances on the machine and over nearby surfaces. This may cause problems with mechanical linkages that may be used to drive various components by friction. Also, it may be advantageous to have a drive system that has a limited amount of slip built in, so that if a device being driven jams that the device attempting to turn it does not burn out.

A common low cost drive mechanism with built in slip may be a drive belt and pulley system. However, in a slick environment the lubricating substances can foul the belt causing it to completely loose friction, and hence drive capability. A typical solution could be to use gears that engage each other directly. However, gears tend to be expensive to produce and require more precise alignment for proper engagement. Also, direct gears are unforgiving as there is no slip between the driving gear and the gear being driven. Typically a clutch might be included to provide some slippage.

Another solution might be to use a drive chain and a toothed sprocket. However while low cost, no built in slip is allowed with a sprocket. Typically a clutch might be included to provide some slippage.

It would be advantageous to have a drive system with limited slip that works in a slippery environment that contains fluids and other slippery substances, is inexpensive and has some built in slippage when driven.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a minimum grip drive sprocket having a knurled chain engagement surface that rotably engages a drive chain typically in an environment exposed to a slick or lubricating medium allowing an acceptable degree of drive chain slip while maintaining rotation of the minimum grip drive socket.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 1 is a top view of a minimum grip drive sprocket engaged with a chain link and having exaggerated features for descriptive purposes;

FIG. 2 is a side view of a minimum grip drive sprocket and having exaggerated features for descriptive purposes;

Like reference numerals are used to designate like parts in the accompanying drawings.

DETAILED DESCRIPTION

Figure 3:
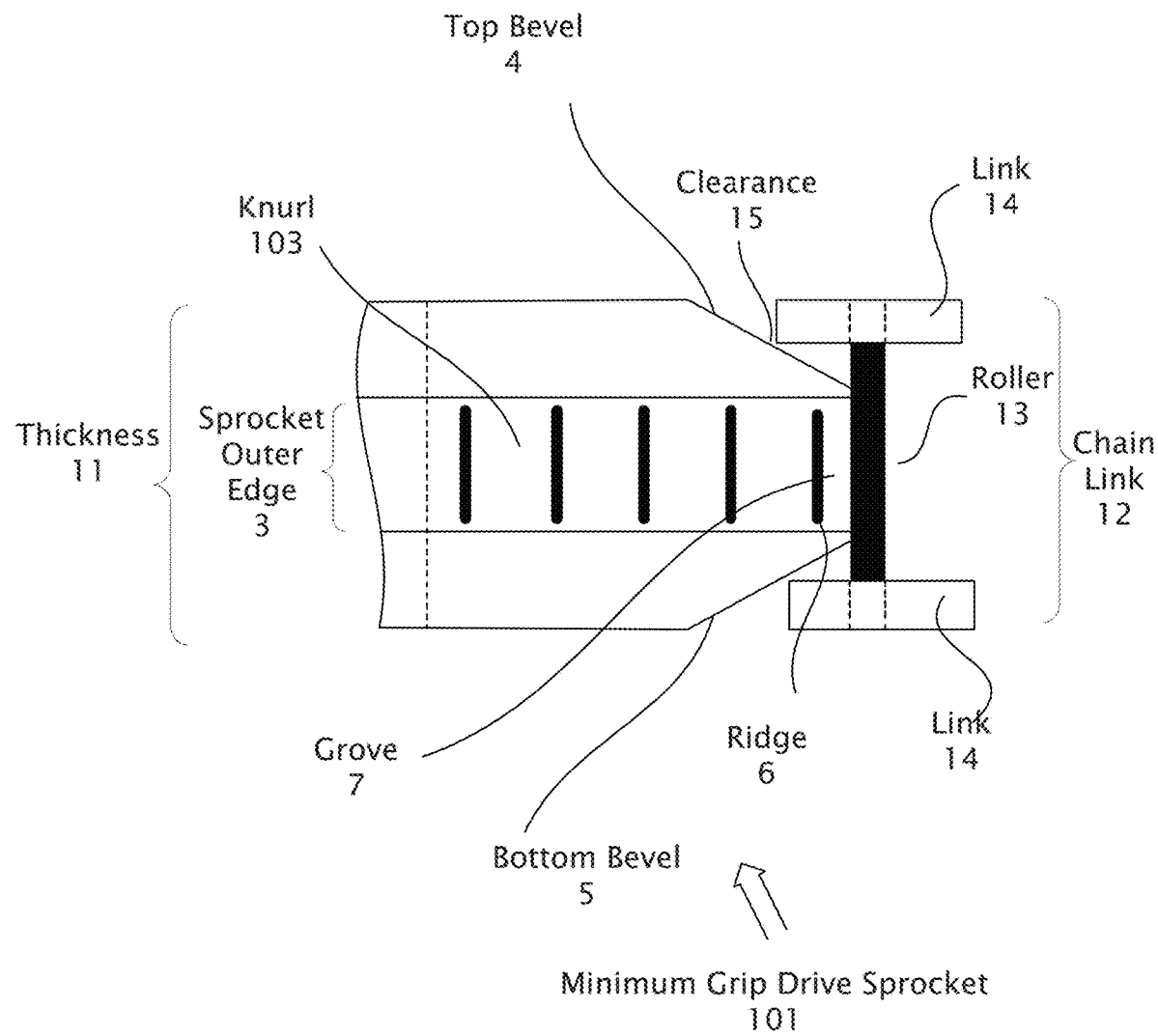
FIG. 3 is a side view of a minimum grip drive sprocket engaged with a chain link and having exaggerated features for descriptive purposes.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a minimum grip sprocket and a drive system utilizing the minimum grip sprocket. Although the present examples are described and illustrated herein as being implemented in a parts cleaning system, the system described is provided as an example and not a limitation. As those skilled in the art will appreciate, the present examples are suitable for application in a variety of different types of systems in which the drive may be subjected to fouling by wet and/or slippery substances.

The minimum grip drive sprocket is useful in applications where slippery substances are present that might foul, or cause complete loss of traction. The minimum grip drive sprocket may slip somewhat, but in general it continues to engage with a coupled drive chain—even when coated with slick and slippery substances. To help maintain the proper slippage the somewhat deep knurling tends to push out excess grease and oil to maintain sufficient engagement.

The minimum grip drive sprocket is particularly useful as a cost effective drive system in low torque applications, and those where some slippage may be tolerated or desired, as opposed to directly engaging gears. A conventional toothed drive sprocket when used in such an environment tends to lock up, as it does not allow slippage. Accordingly a clutch is not needed to allow for slippage as would be needed in a toothed gear sprocket system. It is also worth noting that a rubber belt tends to foul and completely loose traction in a slippery environment. The minimum grip sprocket tends to maintain traction with an acceptable amount of slippage in an oily environment and eliminate the need for a clutch.

FIG. 1 is a top view of a minimum grip drive sprocket (or as used herein "sprocket") 101 engaged with a chain link 12 and having exaggerated features for descriptive purposes. The minimum grip drive sprocket body 1 is generally round and ring shaped, with a knurled minimum grip drive sprocket outer edge 3, and a minimum grip drive sprocket inner edge 2 as shown. The body may also include a top bevel 4 adjacent to the minimum grip drive sprocket outer edge 3. The minimum grip drive sprocket 101 turns about a center axis of rotation 8.

The minimum grip drive sprocket outer edge 3 may include a knurled 103 pattern that can include various patterns of ridges 6 and groves 7. The knurling 103 may be provided to aid in engaging the rollers 13 of a chain to turn the chain. One chain link 12 of an exemplary drive chain is shown in engagement with the minimum grip drive sprocket 101. The chain link shown is a conventional drive chain including links 14 for retaining rollers 13, and coupling to adjacent links (not shown) that make up the drive chain. The minimum grip drive sprocket 101 may also include a bevel 4 that thins the body 1 material so that the rollers 13 of the chain may contact the knurled 103 outer edge 3.

The exemplary minimum grip drive sprocket 101 may be constructed from ferrous metal, although in equivalent examples, aluminum, brass, plastic, nylon or the like may be used.

FIG. 2 is a side view of a minimum grip drive sprocket 101 and having exaggerated features for descriptive purposes. The minimum grip drive sprocket 101 includes a circular aperture 10, centered about a centerline, or axis of rotation 9. The edge of the minimum grip drive sprocket 101 may be beveled on one, or both sides 4, 5. The bevels 4, 5 are formed so that the edge 3 of the minimum grip drive sprocket fits between the links of a conventional metal, or the like, drive chain (14 of FIG. 1). The thickness of the minimum grip drive sprocket at the beveled edge must not be so thick as to prevent the knurled outer edge from contacting, and subsequently driving, rollers (113 of FIG. 1) of a drive chain (12 of FIG. 1).

Adjacent to the outer edge of the minimum grip drive sprocket 3 there are typically a bevels 4, 5, reducing the thickness 11 of the minimum grip drive sprocket 101. A reduction in thickness may be desired to provide clearance of the space between the links of an engaged drive chain (not shown) so that the knurled 103 outer edge may engage the chain roller links (not shown). Various types of reductions in thickness may be provided. Here a linear reduction from overall thickness 11 to minimum grip drive sprocket outer edge thickness 3 is a linear taper. However in equivalent examples reductions of thickness may be made by one or more steps or the like.

The ring shape facilitates coupling to a hub (of FIG. 7) inserted through the aperture 10. However, in alternative examples (not shown) the minimum grip drive sprocket 101 may be disk shaped rather than ring shaped, or equivalent, to attach to a shaft passing through the center of the minimum grip drive sprocket rather than a hub.

The surface of the outer minimum grip drive sprocket edge 3 is typically parallel to an axis of rotation 9 of an installed minimum grip drive sprocket 101.

The knurl 103 may be in a pattern of parallel lines as shown, or other equivalent pattern (cross hatched, dimpled or the like) disposed around the outer edge of the minimum grip drive sprocket 101. Alternatively other irregular or rough surfaces may be utilized that are sufficient to contact the rollers of a drive chain, to the extent needed to turn the minimum grip drive sprocket 101, while allowing some slippage. The knurl 103 in the example shown is a series of parallel groves 7 and ridges. In practice the knurled pattern may be considerably finer than as shown here.

FIGS. 1-2 show the minimum grip drive sprocket 101 from the top and side. The sprocket has a body 1 formed from a flat work piece (typically metal, or the like) of uniform thickness 11. It has a top side and a bottom side of defined thickness 11. It is circular with an outer sprocket edge 3, and a concentric aperture 10 disposed therein. The sprocket 101 is beveled on the top 4 and bottom 5 around the outer edge 3 to reduce its thickness on the outer edge. The sprocket 101 includes a top bevel 4 around the top outer edge, and a matching bottom bevel 5 around the bottom edge. The bevels 4, 5 reduce the thickness of sprocket body 1 to that of a sprocket outer edge 3.

The sprocket outer edge 3 may be knurled or textured. The top and bottom bevels are calculated to reduce the sprocket thickness so that parallel chain links clear the sprocket in the beveled area and allow the sprocket outer edge to engage rollers of the chain with its knurled outer edge.

FIG. 3 is a magnified side view of a minimum grip drive sprocket 101 engaged with a chain link 12 and having exaggerated features for descriptive purposes. The thickness 11 of the minimum grip drive sprocket 101 may be made thin enough so that no bevel is needed to clear the chain links 14, or in the case of thicker minimum grip drive sprockets 101 beveled on the top 4, and or bottom 5 so that the minimum grip drive sprocket outer edge 3, with knurled 103 groves 7 and ridges 6, may extend to the rollers 13. The knurls tend to provide traction against the rollers 13 in a slippery environment. Alternatively, if something happens to prevent the chain from turning the minimum grip drive sprocket may continue to turn by slipping over the knurled 103 surface of the minimum grip drive sprocket 101. If not beveled the links 14 would contact the minimum grip drive sprocket 101 first preventing the knurled surface 103 from contacting the rollers 13. When sized so that the rollers 13 contact the outer edge 3 the bevel may be sized so that the links 14 contact the minimum grip drive sprocket 101, or sized so that there is clearance 15 between the minimum grip drive sprocket 101 and links 14. The bevels 4, 5 also tend to center the chain 12 on the minimum grip drive sprocket 101.

Figure 4:
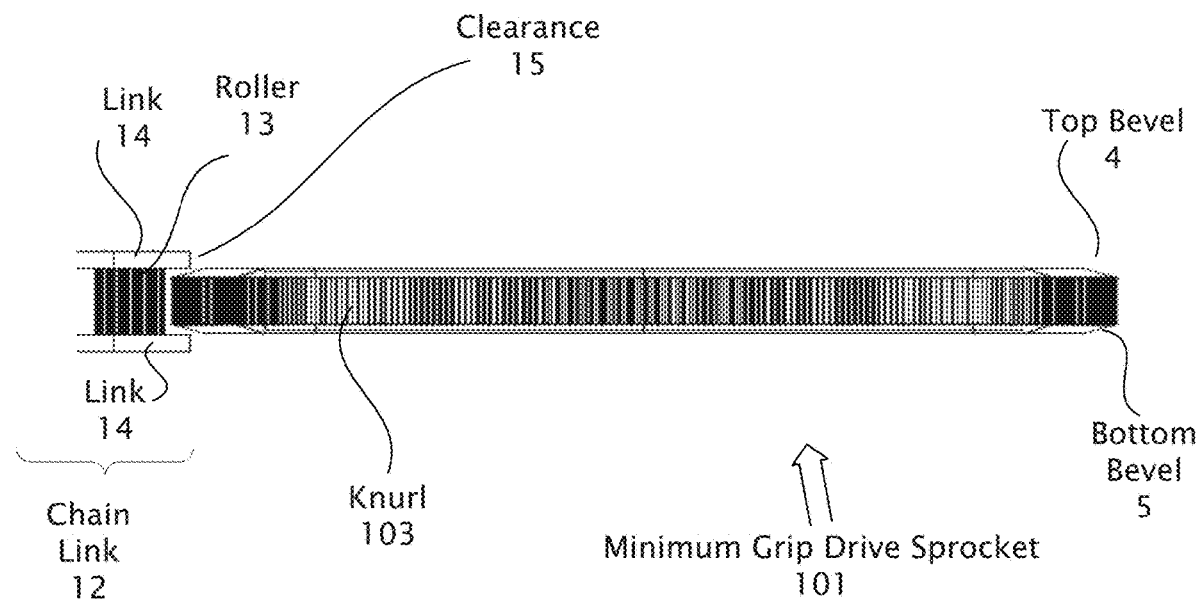
FIG. 4 is a side view of a first example of a minimum grip drive sprocket engaged with a chain link.

FIG. 4 is a side view of a first example of a minimum grip drive sprocket 101 engaged with a chain link 12. This drawing is of truer proportion to a fabricated minimum grip drive sprocket 101. The knurling 103 contacting the roller 13 is quite fine. Top and bottom bevels 4, 5 provide a clearance 15 on both sides of the minimum grip drive sprocket 101 so that links 14 do not interfere with the knurl 103 contacting the chain rollers 13.

Figure 5:
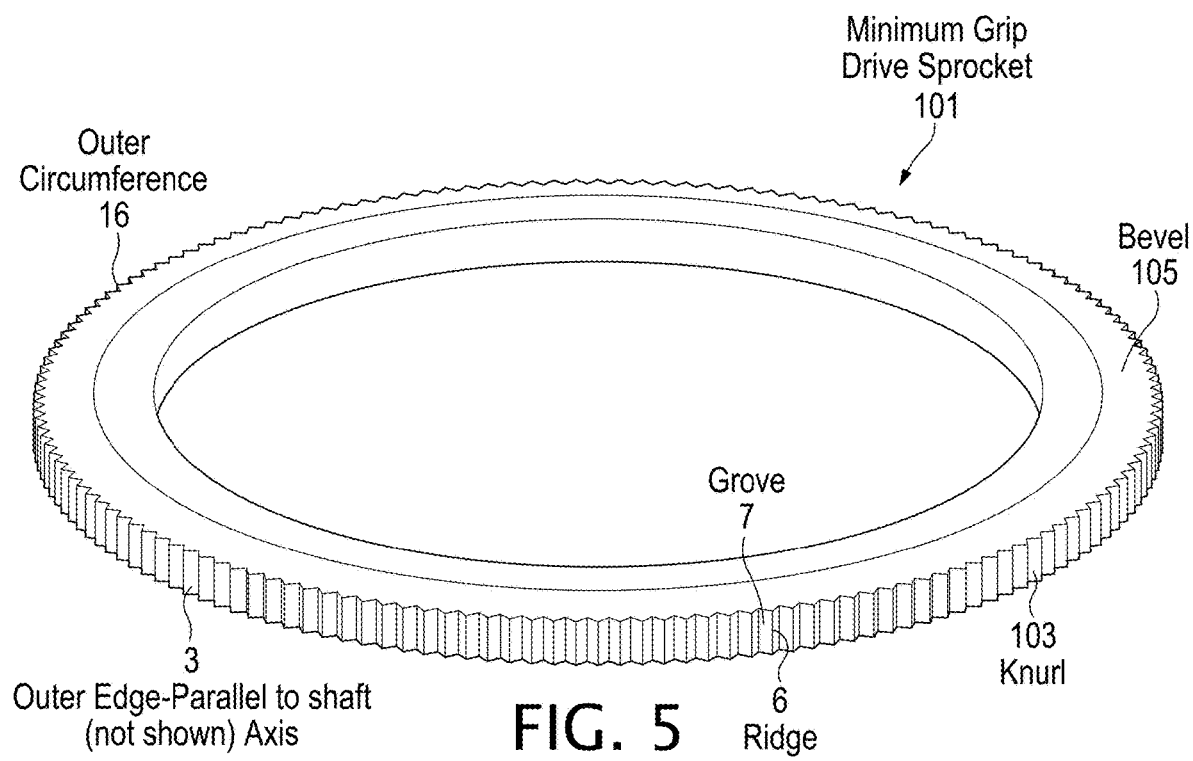
FIG. 5 is an inclined edge view of the first example of the minimum grip drive sprocket.

FIG. 5 is an inclined edge view of the first example of the minimum grip drive sprocket 101. The minimum grip drive sprocket 101 thins down to a reduced thickness beveled edge 105 having groves 7 and ridges 6 on the outer circumference 16.

Figure 6:
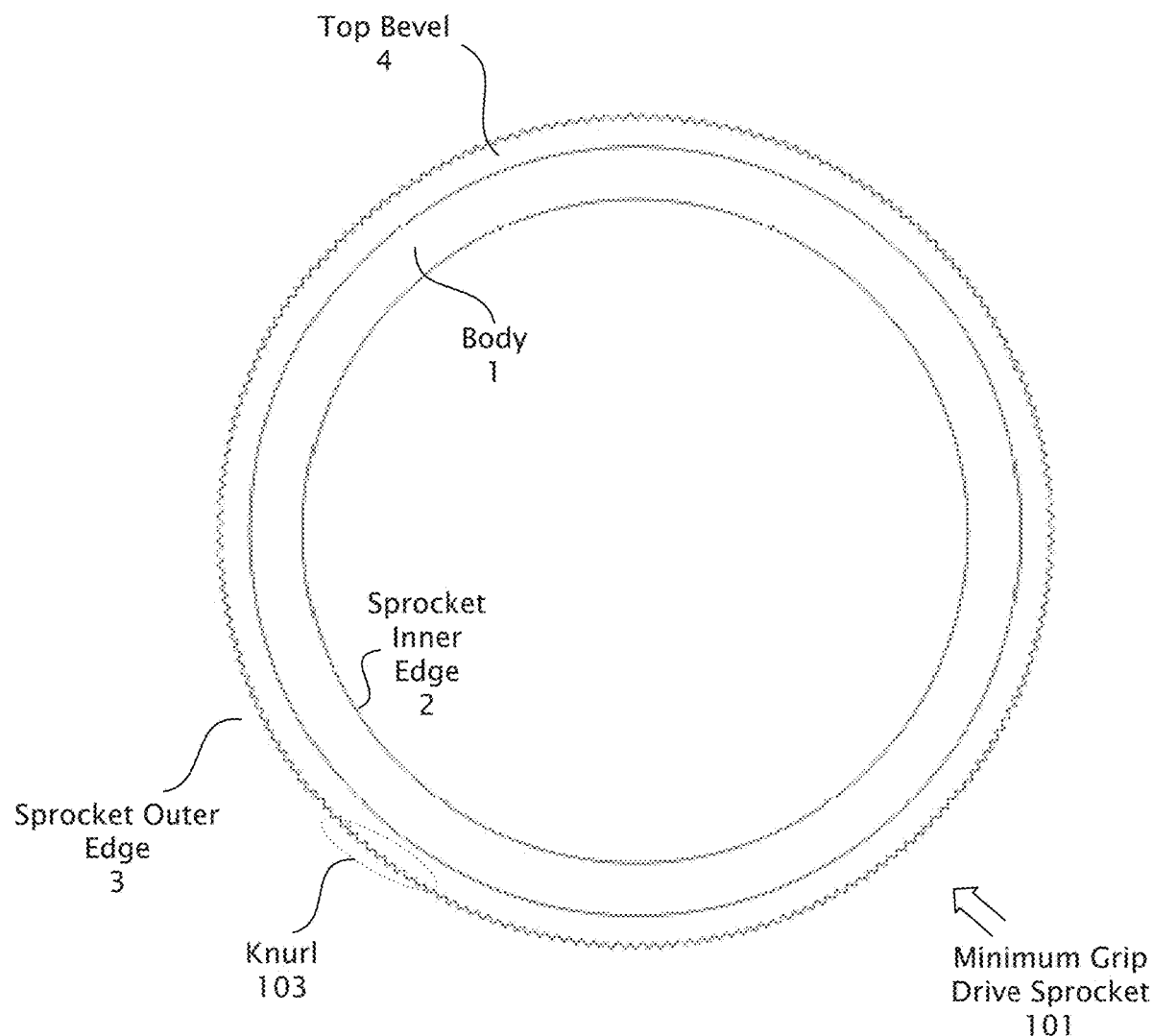
FIG. 6 is a top view of the first example of the minimum grip drive sprocket.

FIG. 6 is a top view of the first example of the minimum grip drive sprocket 101. In this example the top bevel extends over about a third of the width of the ring body 1. The thickness of the minimum grip drive sprocket between the minimum grip drive sprocket outer 3 and inner edge 2 is somewhat narrow as this exemplary minimum grip drive sprocket is made to fit over a hub (not shown). The outer edge 3 includes a knurled pattern 103.

Figure 7:
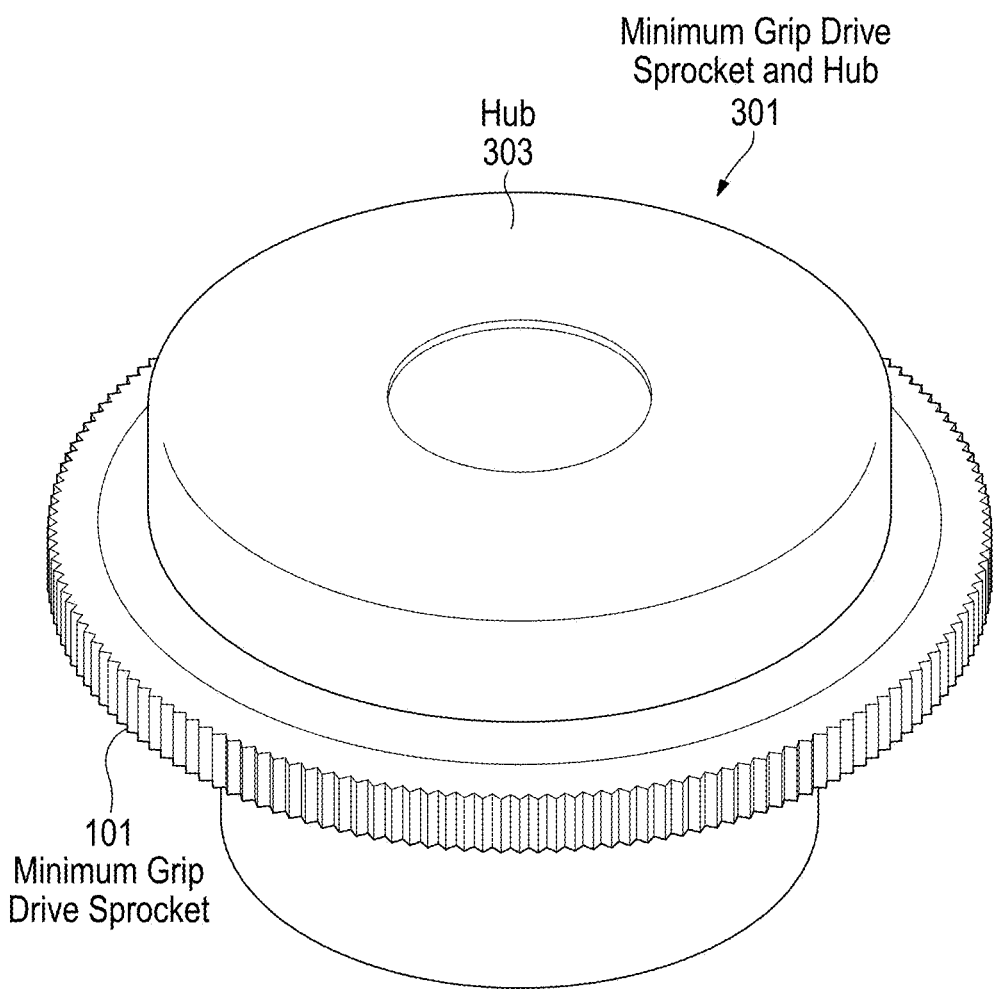
FIG. 7 shows an inclined view of the first example of a minimum grip drive sprocket and a minimum grip drive sprocket attached to a hub.

FIG. 7 shows an inclined view of the first example of a minimum grip drive sprocket 101 attached to a hub 303. Here the minimum grip drive sprocket 101 is welded in spots to the hub 303. This allows a flexible positioning of the minimum grip drive sprocket 101, as it may be attached at various positions along the hub 303 surface. Alternatively the hub and minimum grip drive sprocket may be formed as one piece. Also the minimum grip drive sprocket may be attached to the hub by any equivalent method known to those skilled in the art in the various positions along the hub or continuously.

Figure 8:
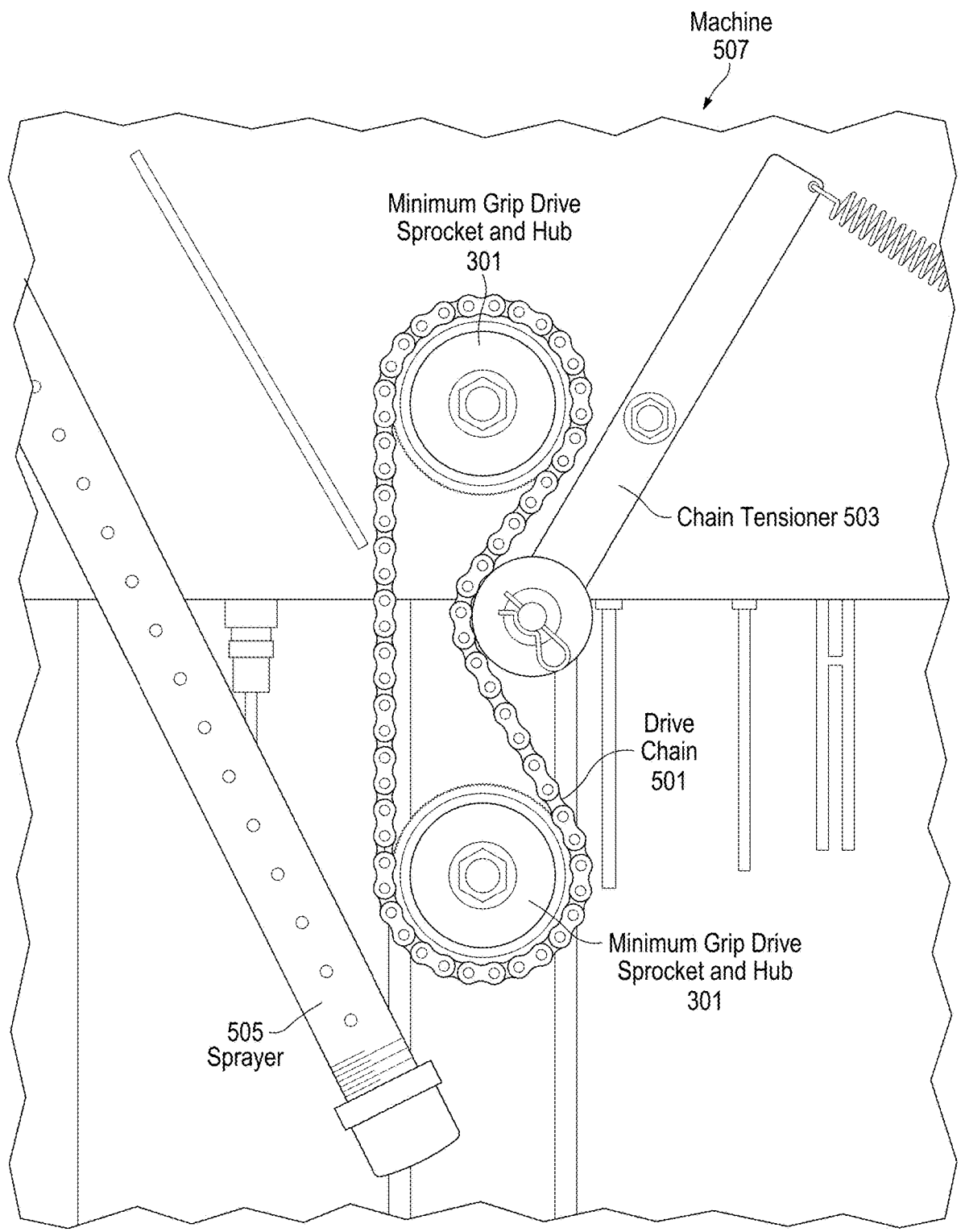
FIG. 8 shows the first example of a minimum grip drive sprocket in use.

FIG. 8 shows the first example of a minimum grip drive sprocket in use in a machine such as an exemplary parts washer 507. Here two minimum grip drive sprockets and hubs 301 are coupled via a drive chain 501. A chain tensioner 503 is provided to take out slack that may be present in the chain, typically through mechanical bias such as a spring or the like. It will be noted that a clutch is not present in the drive train as it is not needed since the slippage in the minimum grip drive sprocket and hub 301, make a clutch unnecessary should a jam occur in the drive train 301 501 where one component stops rotating or "locks". The chain will continue to move as it loses traction on the hub that has ceased turning.

Here the two minimum grip drive sprockets are shown as identical. However, this need not be the case as different diameters or sizes may be used as well as more minimum grip drive sprockets as called for in a given application. Also a single minimum grip drive sprocket may be used in conjunction with other types of minimum grip drive sprockets if desired. In use a slick environment may be present due to a solvent sprayed by sprayer 505 within the machine 507. If a belt and pulley were used, even with a tensioning device 503 excessive belt slippage is more likely to occur than the arrangement using a minimum grip drive sprocket 301.

Figure 9:
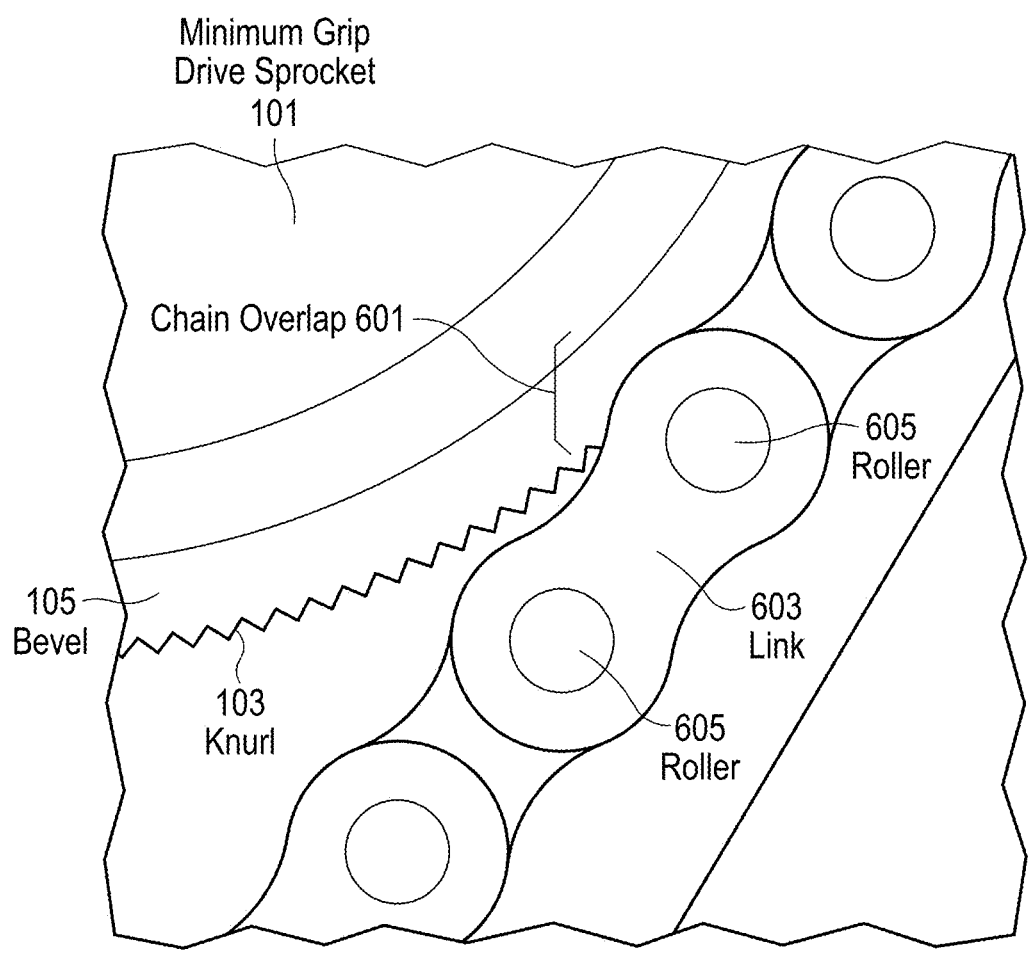
FIG. 9 shows a close up view of a chain and the first example of a minimum grip drive sprocket.

FIG. 9 shows a close up view of a chain and the first example of a minimum grip drive sprocket 101 used in the machine of FIG. 8. The fitting of the minimum grip drive sprocket 101 between drive chain links 603 tends to keep the drive chain 501 from jumping off of the minimum grip drive sprocket 101, especially when traction against the knurled surface 103 may be lost. If a typical exemplary bicycle sprocket (not shown) were used the chain would be kept in place by teeth extending through gaps between chain rollers, but the chain would be locked in place by the sprocket teeth engaging gaps between chain rollers.

The bevel 105 allows the knurled surface 103 to extend between the links and contact the chain rollers 605. The chain 501 has an overlap 601 allowed by the bevel 105. In alternative examples a minimum grip drive sprocket may be made of a uniform thickness sufficient to fit between the links 603. In further alternative examples the bevel 105, instead of being a uniform slope may be a step or other suitable shape so that the knurl 103 may reach and engage rollers 605.

Figure 10:
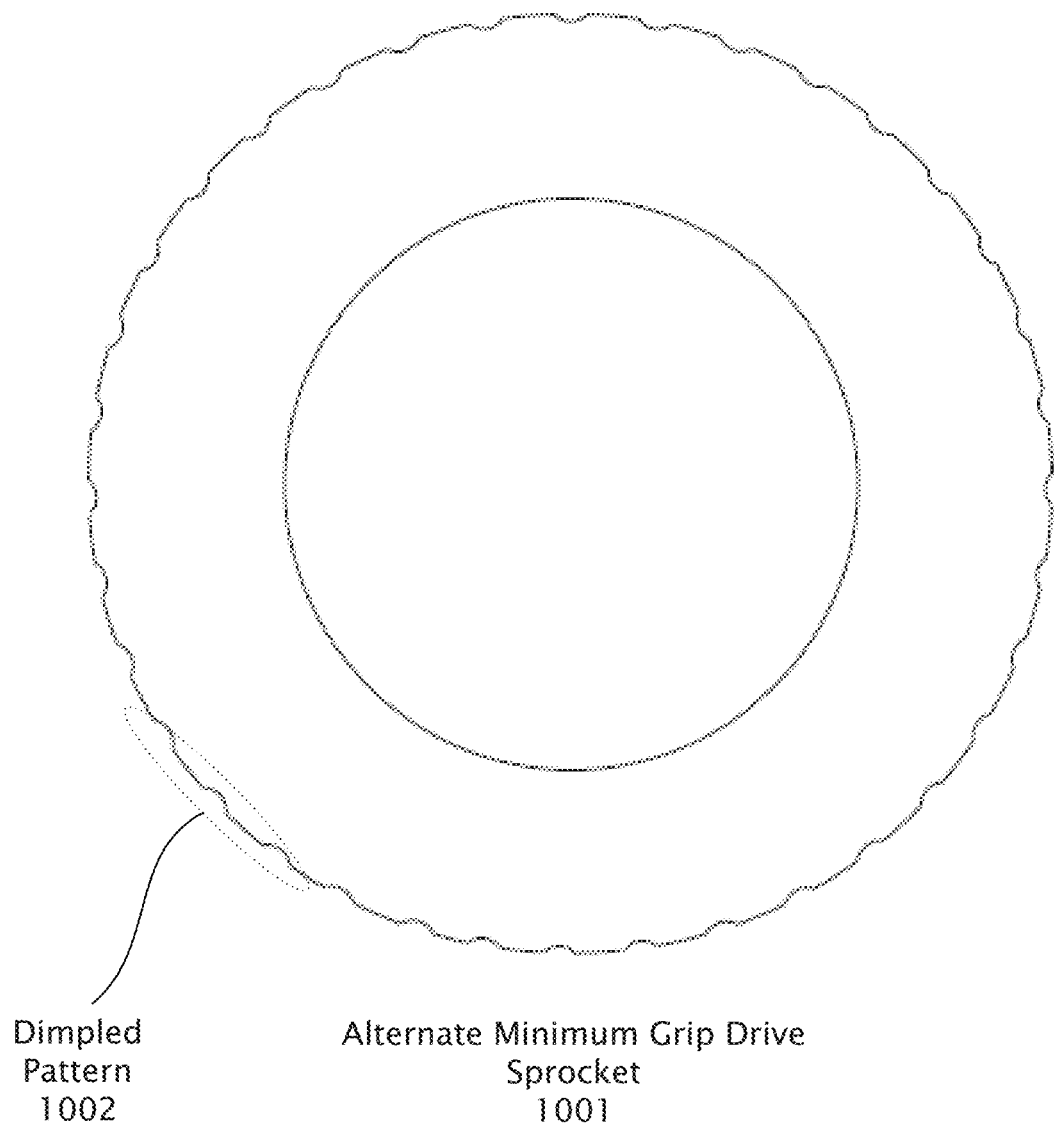
FIG. 10 is a top view of a second example of the minimum grip drive sprocket.

FIG. 10 is a top view of a second example of the minimum grip drive sprocket 1001. The second example of a minimum grip drive sprocket, may be constructed as previously described. However, instead of a knurled pattern about the minimum grip drive sprocket perimeter, a dimpled pattern 1002 may be utilized to provide a rough surface and to clear fouling by dirt and grease.

Those skilled in the art will realize that the process sequences described above may be equivalently performed in any order to achieve a desired result. Also, sub-processes may typically be omitted as desired without taking away from the overall functionality of the processes described above.

The invention claimed is:

1. A chain drive comprising:
a drive chain having a plurality of chain segments, each segment including a pair of link plates separated at a fixed distance by a pair of rollers;
a minimum grip drive sprocket engaging the chain;
whereby the chain may intermittently slip over a knurled surface on an edge of the minimum grip drive sprocket in the presence of a slippery environment; and
whereby drive chain is sized so that the chain rollers contact an outer edge of the minimum grip drive sprocket.

2. A minimum grip drive sprocket comprising:
a circular metal ring having a uniform thickness over a body portion and having a flat top side and a flat bottom side;
a top circular bevel extending from an outer edge of the flat top side to a first outer edge of reduced thickness,
a bottom circular bevel extending from an outer edge of the flat bottom side to a second outer edge of reduced thickness
whereby an outer edge has a height less than the thickness and extending around the outer circumference of the circular metal ring is formed by the top and the bottom bevel; and
a knurled surface treatment applied to the outer edge.

3. A minimum grip drive sprocket comprising:
a flat ring shaped sprocket body of a thickness with a center aperture, a top side, and a bottom side;
a beveled ring area surrounding the ring shaped sprocket body reducing the thickness of the body evenly from each side to a reduced thickness outer sprocket edge; and
a knurled surface disposed on the outer sprocket edge.

4. The minimum grip drive sprocket of claim 3, further comprising a hub disposed in the aperture.

5. The minimum grip drive sprocket of claim 3, in which the knurled surface is a series of alternating vertical ridges and groves.

6. The minimum grip drive sprocket of claim 3, in which the knurled surface is a crosshatched pattern.

* * * * *